United States Patent

Goldberger

[15] 3,647,398
[45] Mar. 7, 1972

[54] PROCESS FOR REMOVING GANGUE FROM SULFUR-BEARING MATERIALS

[72] Inventor: William M. Goldberger, Columbus, Ohio

[73] Assignee: Corporation de Fomento de la Production, Santiago, Chile

[22] Filed: Mar. 21, 1969

[21] Appl. No.: 809,194

[52] U.S. Cl. .................. 23/312 S, 23/308 S, 23/270.5, 23/224, 23/229
[51] Int. Cl. ............................ C01b 17/14, B01d 12/00
[58] Field of Search .............. 23/293, 308, 309, 310, 312, 23/270, 270.5, 224, 229

[56] References Cited

UNITED STATES PATENTS

| | | | |
|---|---|---|---|
| 1,408,467 | 3/1922 | Perry | 23/308 |
| 1,446,307 | 2/1923 | Hunt | 23/308 |
| 1,457,793 | 6/1923 | Perry | 23/308 |
| 1,548,109 | 8/1925 | Thornton | 23/308 |
| 1,586,539 | 6/1926 | Thornton | 23/308 |
| 1,990,602 | 2/1935 | Guernsey | 23/308 |
| 2,253,566 | 8/1941 | Klepetko | 23/308 |
| 2,934,413 | 4/1960 | McGauley | 23/308 |
| 2,934,414 | 4/1960 | Bradley | 23/312 |
| 3,042,502 | 7/1962 | McGauley | 23/312 X |
| 3,306,446 | 2/1967 | Lewis | 23/229 X |
| 3,364,988 | 1/1968 | Hartmann | 23/270.5 X |

Primary Examiner—Norman Yudkoff
Assistant Examiner—S. J. Emery
Attorney—John B. Armentrout

[57] ABSTRACT

A process for removing gangue from sulfur-bearing materials, such as silica from sulfur ores or concentrates, includes melting the sulfur-bearing material having the gangue in the molten sulfur consist essentially of minute solid particles. A stream of water is introduced flowing in droplet form through the molten sulfur as a matrix having the droplets coalesce in the effluent of the stream exteriorly of the molten sulfur. Quantities of the minute gangue particles are carried off from the molten sulfur by the action of the water droplets which wet the gangue and cause the gangue to be brought to the sulfur-water interface, and by maintaining the flow rate of the coalesced water exteriorly of the molten sulfur within a range of velocities sufficient to load the coalesced water with quantities of minute gangue particles and entrain these particles in the effluent water stream. In preferred embodiments the molten sulfur is caused to flow countercurrently to the droplets of water passing through the molten sulfur such as through having the sulfur follow a downward course while the water droplets are ascending in the sulfur. Also, in certain preferred embodiments the molten sulfur is subjected to flowing water droplets in counter flow as carriers for quantities of the minute gangue particles present in each of a series of regions along the flowing sulfur and the water stream.

14 Claims, 4 Drawing Figures

INVENTOR
William M. Goldberger
BY John B. Hunnahran
ATTORNEY

PROCESS FOR REMOVING GANGUE FROM SULFUR-BEARING MATERIALS

This invention relates to the purification of sulfur-bearing materials and more especially is concerned with a method for effectively eliminating impurities such as silica or other high-melting point gangue from sulfur-containing impure material whereby the purity of sulfur is upgraded.

Sulfur for industrial uses has been produced mainly from sulfur dome deposits located beneath the earth's surface in the regions surrounding the Gulf of Mexico. This type of sulfur is economically recovered by the Frasch mining method which involves pumping hot water below ground into the deposit to melt the sulfur. The Frasch process yields a high-grade product containing generally less than 1 percent gangue impurities. This sulfur can be readily filtered in a molten condition to yield bright sulfur containing almost no gangue. Low-gangue sulfur is required for such purposes as making sulfuric acid most economically in a contact acid plant. Any gangue such as silica, clay or other ash forming materials in the sulfur tends to accumulate within the catalyst bed of the acid plant. High-gangue content sulfur, that is sulfur with more than 100 p.p.m. gangue, therefore is burned to make acid production in an acid plant more typical of a pyrite roaster plant. This type of acid plant includes special equipment to remove the ash from the roaster gases. Because of this additional gas-cleaning apparatus and associated operations, it costs more to produce acid in a pyrite type plant.

It is generally recognized that production of high-purity sulfur from low-grade sulfur ores including volcanic sulfur deposits is noncompetitive with Frasch sulfur. This has been especially true for the production of sulfur containing less than 10–20 p.p.m. ash. Many production methods have been proposed and developed and numerous plants have been built and operated for recovering sulfur from low-grade sources. The plants which have had greater success combine the basic process operations of froth flotation and purification of the molten concentrate by melting in contact with water. This latter operation is accomplished under pressure because the melting point of sulfur exceeds the boiling point of water. Therefore pressure vessels or autoclaves are used.

Both filtration and autoclave operations as practiced in prior art processes introduce difficulties and expense. Whereas filtration can yield a high-grade product, the operation requires frequent removal of the filter cake from the filtration equipment. For example, with the use of Niagra-type pressure leaf filters, filtration of a molten 90 percent grade flotation concentrate would require that the filter operation be terminated after 60–90 minutes of filtration. The filter then would be opened to remove the cake, closed again, and the cycle repeated. In addition, it generally proves to be beneficial to apply a precoat of diatomaceous earth to enhance the filtering operation. Thus, in the overall filtration cycle, filtration may be undertaken only about half of the time, the other time being spent on opening, draining, cleaning the filter, filling the filter, and applying the precoat. For such reasons, filtration of molten sulfur from low-grade volcanic ores has been both cumbersome and expensive. Although continuously operated pressure filters have been developed for other uses and may be applied to sulfur, this equipment is not generally available and, the cost is excessive for producing sulfur at competitive prices. Autoclaving has proved to be simpler and more economical than filtration, but a high-grade product containing less than 100 p.p.m. is generally not achieved.

An object of the present invention is to carry off gangue efficiently and with high selectivity from molten sulfur even where appreciably large quantities of gangue are encountered in the sulfur-bearing material being treated. Another objective herein is to reduce the cost of removing gangue from molten sulfur toward obtaining a high-purity sulfur product. A further objective is to use relatively inexpensive apparatus which is easy to construct and simple to operate. Yet another object of this invention is to base gangue removal from molten sulfur upon a mode which readily lends itself to continuous operation and automation. Other objects in part will be obvious and in part pointed out more fully hereinafter.

In accordance with this invention a sulfur-bearing material, such as sulfur ore or a sulfur ore concentrate, containing gangue, is provided characterized by having the gangue consist essentially of minute solid particles which for example is assured by suitable milling operations. Sulfur of the thus characterized sulfur-bearing material is melted and minute solid particles of the gangue are dispersed in the molten sulfur in preparation for sulfur purification. A stream of water is sustained wherein droplets of the water are provided such as by flowing the water stream influently to a plurality of dropleting orifices, illustratively those of a multiapertured plate, of a screen, or of a porous bed. As will be more fully explained hereinafter the water droplets serve as carriers. The droplets are made to flow through a matrix afforded by the molten sulfur and coalesce effluently from the matrix, thereby giving effluent water of the water stream from the molten sulfur. Quantities of the minute gangue particles are carried off from the molten sulfur by the action of the water droplets, which wet the gangue and cause the gangue to be brought to the sulfur-water interface, and by maintaining the flow rate of the coalesced water exteriorly of the molten sulfur within a range of velocities sufficient to load the coalesced water with quantities of minute gangue particles and entrain these particles in the effluent water stream.

An important purification action is caused by the inherent difference in the affinity of sulfur and the minute gangue particles for water. Sulfur being highly hydrophobic has little tendency to enter the water phase, whereas silica, clay and other usual gangue materials, which are quite hydrophilic, have a tendency to become wetted and dispersed in the water phase. Upon contact between water droplets passing through the molten sulfur matrix and particles of gangue contained in the matrix, the water wets the gangue particles and the gangue is retained at the water-sulfur interface of the water droplet and the molten sulfur or enters the water droplet, and thus the gangue is brought to the water phase and is removed from the molten sulfur. Outside the molten sulfur the water phase is sustained at a velocity which exceeds the terminal settling velocity of the minute gangue particles and accordingly is used for suspending and conveying away particles of gangue removed by the water droplets from the molten sulfur.

The mode of contact offered herein between sulfur and water phases forms a basis for an effective and highly satisfactory removal of gangue from sulfur-bearing materials. An alleviation of demand for water is had by reason of bringing this phase in droplet form into the molten sulfur matrix. The water droplet areas soon represent a large total area of water passed into contact with the molten sulfur matrix, thus for the water to carry away particles of gangue. Through having the gangue particles minute, they are well suited for being caught in the water droplet flow, and furthermore sulfur loss in the carry-off from having sulfur still physically locked inside the gangue particles is greatly diminished by the gangue particle size being small. Accordingly a gangue particle size of about −150 mesh in the molten sulfur being purified is found to be advantageous, having substantially all larger gangue particles omitted from the melt. Since sulfur has a melting point which is higher than the boiling point of water, the water droplets and the molten sulfur encountering the water droplets are kept at temperatures and superatmospheric pressures which suppress steam, and preferably at temperatures and superatmospheric pressures sufficient for maintaining water and sulfur each substantially entirely in liquid phase.

In certain preferred embodiments of the present invention the molten sulfur is subjected to water droplets in each of a series of regions along the water stream having the water droplets passing from the molten sulfur coalesce and load the effluent water from each of the regions with quantities of the minute gangue particles thereafter carried in the effluent water. The latter procedure is found to be advantageous particularly where the procedure is accompanied by flow of the molten sulfur itself through the series of regions in countercurrent to the flowing water thus for the water to carry off particles of gangue additively in passing through each of the regions and the molten sulfur to become progressively pure by flowing through the regions. Moreover, it will be seen that the invention well lends itself to gravity feed of the molten sulfur having the water droplets supplied to rise through the molten sulfur matrix in effecting gangue particle carry-off.

In the accompanying drawing which illustrates one manner of carrying out the present invention and equipment which advantageously can be used:

Figure 1:
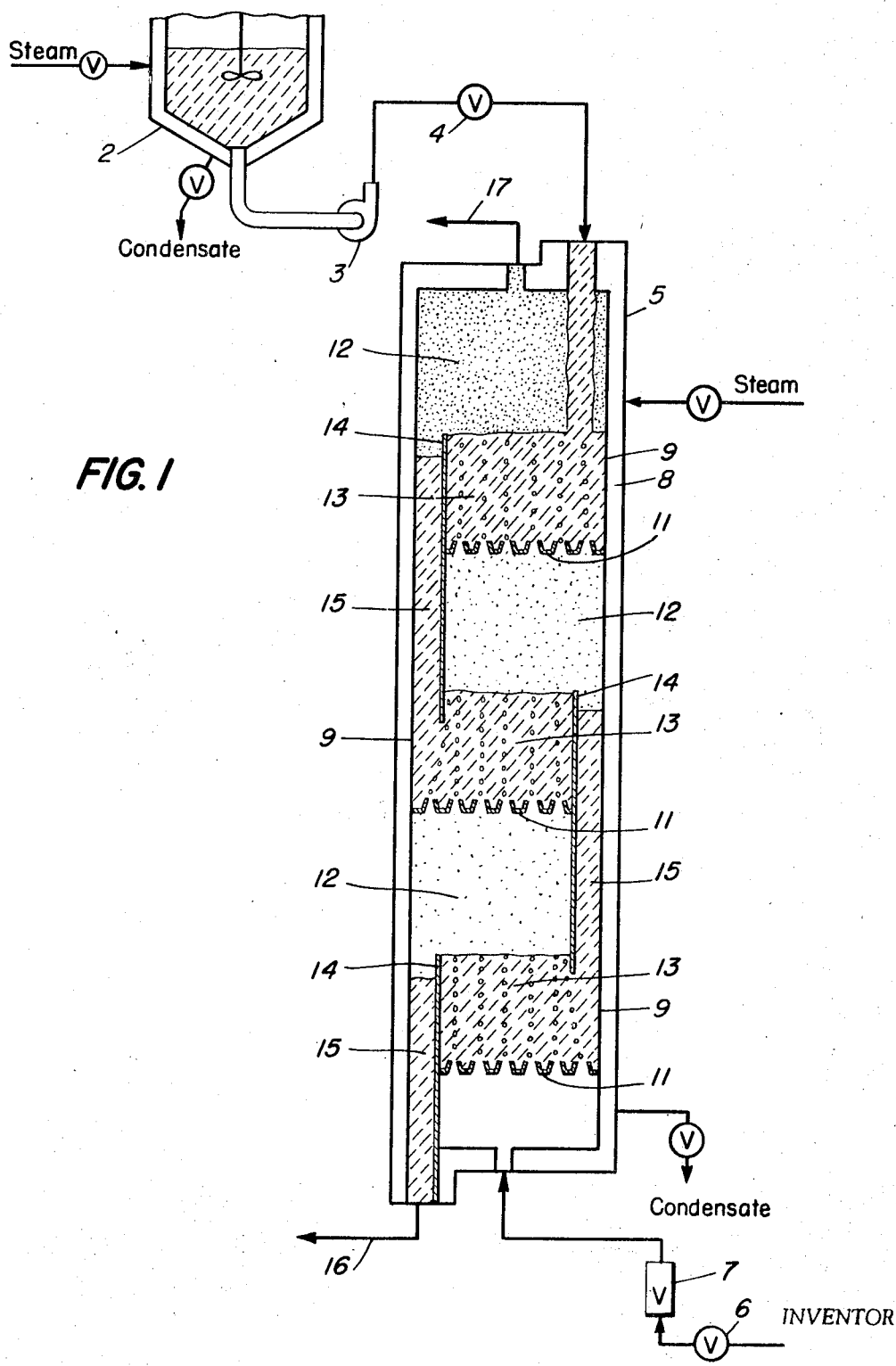
FIG. 1 represents schematically a flow system accommodating the impure molten sulfur and the gangue stripping water.

In the embodiment of my invention according to FIG. 1, impure sulfur such as Chilean ore or Chilean ore concentrate of the character referred to herein containing gangue or ash-forming impurities is maintained in a molten state in the preheating tank 1 having the gangue or ash-forming impurities consist essentially of a dispersion of minute solid particles of approximately −150 mesh size sustained in molten sulfur of the melt. The temperature in tank 1 is maintained above the melting point of sulfur (246° F.) by steam of jacket heater 2 or other suitable heating means. Molten impure sulfur is fed continuously by pump 3 through a rate control valve 4 into the upper portion of the vertical purification column 5. Heated water enters the base of column 5 through control valve 6 and meter 7. Column 5 is provided with a steam jacket 8 to supply sufficient heat to column 5 for maintaining the sulfur contained in the column in a molten condition.

Column 5 is for example circular in cross section having an inside diameter of 60 inches and is characterized by having a plurality of contact regions 9 which are in the molten sulfur flow path and are also in the water flow path through the column. Purification of the molten sulfur is effected in a plurality of contact stages, the molten sulfur in each of the stages being subjected to water droplets flowing from small holes in a plate 11 in the contact region 9. The holes in each plate 11 illustratively are of one-quarter inch diameter spaced apart from each other three-quarters inch on centers substantially throughout the cross section of column 5.

It is known that molten sulfur and water are virtually immiscible and therefore a mixture of these two liquids will form two distinct phases. The water being of lower specific gravity tends to rise and sulfur being of heavier specific gravity tends to sink. Thus at each of the contact stages within the column 5 two distinct liquid layers are present; an upper water layer 12 and a lower molten sulfur layer 13. The molten sulfur layers 13 in the contact regions 9 are maintained by impounding the molten sulfur behind weirs 14 so that these sulfur layers overlie the plates 11 while the molten sulfur spills off through downcomers 15 from the weirs. The downcomers 15 occur on alternate sides in the molten sulfur flow path within the column 5 for the molten sulfur entering each of the layers 13 in the course of flow to cross over a related plate 11 in seeking the next of the downcomers 15.

It will be understood that countercurrent movement of the molten sulfur and the water is sustained continuously through column 5. The molten sulfur in layers 13 in the contact regions 9 flows having the sulfur thence move through the downcomers 15. The water phase meanwhile flows from meter 7 and is dropleted into the molten sulfur in the lowest of the contact regions 9 in passing through the small apertures in the related plate 11, and thence the water droplets course through the molten sulfur layer 13 in the stage and coalesce in the effluent water layer 12 of the stage. The flow of the water phase thereafter continues passing upward progressively through the small apertures in each of the next upper plates 11 in the respective upper contact regions 9, whereupon there is a dispersion of droplets of the water through each of the upper molten sulfur layers having the droplets coalesce in the effluent water 12 of the contact stage. The water droplets in the several contact stages move through the molten sulfur layer 13 of the stage having the latter layer serve as a matrix. The droplets coalesce at the interface of water layer 12 and sulfur layer 13 in each of the contact stages, and the effluent water from layer 12 in the uppermost contact stage of the column 5 has egress from the column 5 through the water outlet line 10. The countercurrent action of the sulfur and water phases enables the sulfur product to leave the separation column through an outlet 16 adjacent to the location at which the water enters the column. The course of the molten sulfur supplied from tank 1 into the top of the column progresses through the regions 13 in an order of sequence beginning with the uppermost of these regions and thereafter including the intermediate and lowermost of these regions and thence through outlet 16 while the water entering the bottom of the column progresses in a reverse order of the aforementioned sequence beginning with the lowermost of the regions and thereafter including the intermediate and uppermost of these regions and thence flows through water outlet 17 from the top of the column. This arrangement causes clean water for which the gangue has greatest affinity to enter contacting sulfur which contains least gangue adjacent to the bottom of the column and accordingly provides maximum gangue stripping action to yield a sulfur product which is virtually free of contained gangue through outlet 16. The purification action that occurs with the aid of the ascending water phase in the column results from an adherence of the minute gangue particles in the molten sulfur to the surface of the water droplets in the several contact stages. The water droplets serve as carriers for stripping and transporting the gangue from the molten sulfur layers 13 in the several contact stages, the effluent water introduced by coalescence of the water droplets into each of the water layers 12 being laden with gangue in concentrations which increase from each layer 12 to the next upper layer 12 in the column. Thus relatively highly heavily gangue-laden water in the uppermost layer 12 in the column carries off gangue through outlet 17. Meanwhile, the velocity of the ascending water phase through column 5 on the cross section of the column is sustained to be higher than the terminal settling velocity of the gangue particles which are being conveyed from the column by the water phase. Furthermore, a continuous feed of the molten sulfur is meanwhile maintained at a rate for the moving sulfur to reside exposed to the gangue-stripping action of the water in column 5 for a period of time of at least about 15 minutes and preferably for a period of time of at least one-half hour to give the resulting sulfur product which is virtually free of gangue. Column 5 also is kept under sufficient pressure inside to prevent vaporization of the stripping water.

The following are examples of tests performed with a single-stage separation column and will serve to illustrate operating conditions and function of the present invention.

EXAMPLE 1

A single-stage purification apparatus comprising, a steam jacketed, approximately 3-inch ID stainless steel column, and a water preheater section, had the column charged with fused, coarse crushed impure sulfur obtained by flotation beneficiation of finely ground volcanic sulfur ore from the northern region of Chile. The flotation concentrate contained 11.02 percent gangue. Water was admitted to the base of the separation column and dispersed into droplets through a perforated plate distributor made having 0.0595-inch diameter holes 27 in number spaced on approximately one-half inch centers. A thermocouple located within a thermowell directly above the perforated plate was used to measure the temperature in the sulfur pool. The conditions of the test were as follows: operating temperature, 260° F.; water flow-rate, 0.6 g.p.m.; column pressure, 55 p.s.i.g. Receivers were provided to collect the water effluent leaving the column.

The separation was performed on a 1,000 gram batch of flotation concentrate. The concentrate was first charged to the column and water was made to flow at the desired rate. Steam was then admitted to the steam jacket to preheat the entering water and to cause the sulfur to melt. When the measured temperature was 250° F., gangue material became evident in the water effluent. With time at 260° F., the water effluent became increasingly clear and after about 30 minutes, there was virtually no suspended gangue in the water effluent. The distribution of material for this experiment is given in Table 1.

TABLE 1.

Sulfur and Gangue Distribution Data —Example No. 1

| Material | Weight, grams | Analysis, percent Sulfur | percent Gangue | Weight, percent Sulfur | Gangue |
| --- | --- | --- | --- | --- | --- |
| Sulfur charge | 1,000 | 89.98 | 11.02 | 899.98 | 110.2 |
| Recovered Sulfur | 864.7 | 99.994 | 0.006 | 864.7 | neg. |
| Water effluent | 40.3 (gal) | — | 2.72 g./gal.(a) | — | 113.4 |

(a) Average.

As can be noted from this test, there was effective removal of gangue from the sulfur by the stripping water to produce a sulfur product containing less than 100 p.p.m. gangue. The recovery of sulfur was 96.2 percent.

EXAMPLE 2

The same apparatus described in Example 1 was charged with 1,346 grams of volcanic sulfur ore from the northern region of Chile which had been preliminarily ground in a pebble mill for 30 minutes and then filtered and dried overnight at 70° C. This ground dried ore for the charge was screened through 270 mesh, then melted at 130° C., solidified, and crushed to pieces approximately one-half to 1 inch in size. The ore was analyzed and found to contain 41.99 percent gangue.

The same test procedure for separation was used with reference to this charge as that described in Example 1. The water flow rate was 0.6 g.p.m. and the temperature was 260° F.

The test was completed within 60 minutes after admission of steam for heat to the steam jacket. After cooling and solidifying the purified sulfur, analyses showed that the sulfur contained less than 0.34 percent gangue overall with a higher purification at the bottom of the melt. Samples of sulfur from the region of the orifice plate contained less than 0.03 percent gangue; however, some coarser gangue material had been stripped from the bulk sulfur but remained floating at the horizontal interface formed between the molten sulfur pool and the coalesced water. Calculation showed that the water rate was insufficient for entrainment of gangue coarser than about 325 mesh.

Example 2 illustrates that ground sulfur ore can be purified by direct contact water stripping to produce a high-purity sulfur product. This experiment also demonstrates that to obtain suitable purification, the design of the apparatus and selection of flow rates should be made to provide adequate water velocity for entrainment of substantially all gangue particles present in the impure sulfur feed. An indication of the relationship between required water velocity and size of gangue particle is given in Table 2 which is based on calculated terminal settling velocities for various sized gangue particles.

TABLE 2.

Minimum Water Velocity for Removal of Gangue Particles by Entrainment in Water at 270° F.

| Gangue Particle Size, Tyler Mesh | Particle Diameter, micron | Minimum water Velocity, ft./sec. |
| --- | --- | --- |
| 48 | 297 | 1.45 |
| 100 | 149 | 0.37 |
| 150 | 105 | 0.18 |
| 200 | 74 | 0.09 |
| 325 | 44 | 0.03 |

Ideally, the stripping water requirement in the present process is of course kept as low as possible for such reasons as to minimize the sensible heat duty of the process. Insight to a realization of what the minimum water requirement will be is had through a consideration of two factors; namely, (1) that the gangue content accumulated in the stripping water before the stripping action is lost should be near a maximum and (2) that the water velocity needed for complete entrainment of the gangue particles which are to be removed should be near a minimum. Regarding maximum gangue content accumulated in the stripping water before the stripping action is lost, the ability to strip gangue depends on the surface area of the water droplets available for adhesion of the gangue, but there is also the factor of maximum size of the gangue particle which will adhere to the droplet.

Figure 2:
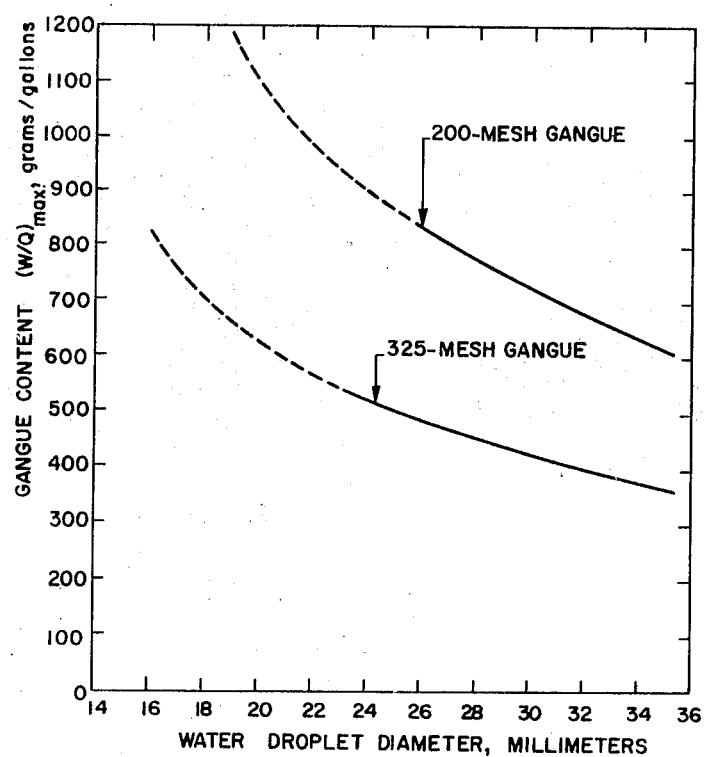
FIG. 2 is a graph dealing with maximum gangue content in gangue stripping water.

Results of calculations made for a theoretical maximum of gangue content in water as a function of water droplet diameter versus gangue particle sizes of 200-mesh and 325-mesh are graphically represented in FIG. 2, the water droplet diameter being measured on millimeter scale and the gangue content of the water being in grams per gallon. On the latter basis it appears that the theoretical limit on the amount of gangue which dispersed water can remove is somewhere in the vicinity of 1,000 grams of gangue per gallon of stripping water.

EXAMPLE 3

Studies on minimum stripping water requirement, in terms of actual tests made on a Chilean ground ore concentrate containing 88.7 percent sulfur and 11.3 percent gangue, prepared from the ore ground to pass through a 270-mesh screen, indicate that water supplied through a perforated plate distribution into this flotation concentrate having the sulfur in a molten condition, removes upwards of 100 grams of the gangue per gallon of the stripping water, with a good probability further being indicated that gangue removal levels as high as 200 grams or more per gallon of better dispersed stripping water is possible, although the theoretical limit of about 1,000 grams per gallon likely cannot be achieved in actual practice. The tests just referred to were made on the ore flotation concentrate through housing the impure molten sulfur in an approximately 1½ inch ID column having an outlet for the effluent water 8¼ inches above the perforated plate with the impure molten sulfur standing on the plate in the column to a depth of 4-inches. The plate contained 19 one-sixteenth inch diameter holes substantially uniformly spaced on the cross section of the column, and the water velocity on the cross section of the column was 0.079 centimeter per second sustained for a duration of 130 minutes at an operating temperature of 270° F. and an operating pressure of 90–100 p.s.i.g. within the column. An accounting is given in Table 3 below concerning the material balance in view of the amount of the sulfur concentrate charged into the column.

TABLE 3. — MATERIAL BALANCE

| | | |
| --- | --- | --- |
| Total Charge of ore | concentrate to column, grams | 176 |
| Gangue Content, percent | | 13.0 |
| Gangue Content, grams | | 23 |
| Sulfur Content, percent | | 87.0 |
| Sulfur Content, grams | | 153.0 |
| Sulfur Product removed from | column, grams | 105 |
| Gangue Content, percent | | 3.6 |
| Gangue Content in sulfur product, gram | s | 3.8 |
| Sulfur Content, percent | | 96.4 |
| Sulfur Content, grams | | 101.2 |
| Water fed to column, total gallons | | 1.630 |

| | |
|---|---:|
| Solids Content of water, (a) grams | 0.994 |
| Water drawn off column, total gallons | 1.630 |
| Total Solids Content of water, grams | 17.90 |
| Gangue Content of water, net grams | 16.91 |
| Gangue Accountability, (b) percent | 90.0 |
| Gangue Rejection, (c) percent | 73.5 |

(a) Tap water initially containing 0.61 g./gal. dissolved solids.

(b) Gangue Accountability =

$$\frac{\text{Gangue recovered in water} + \text{gangue recovered in purified S}}{\text{Gangue contained in material charged to column}}$$

(c) Gangue rejection =

$$\frac{\text{Gangue recovered in water}}{\text{Gangue contained in material charged to column}}$$

Grade of the sulfur-bearing material is a factor in determining minimum water requirement for stripping. There is a rapid decrease in the amount of water and heat required as the grade of the sulfur presented for the feed is increased to be above less than about 15 percent gangue content. Accordingly the present process often is introduced to follow upon preliminary concentration operations such as those involving flotation which minimize the water and heat requirements for stripping the molten sulfur of gangue in the resulting preliminarily concentrated product. A general flow sheet showing the integration of practice of the present invention with a flotation preconcentration system is given in FIG. 3.

Figure 4:
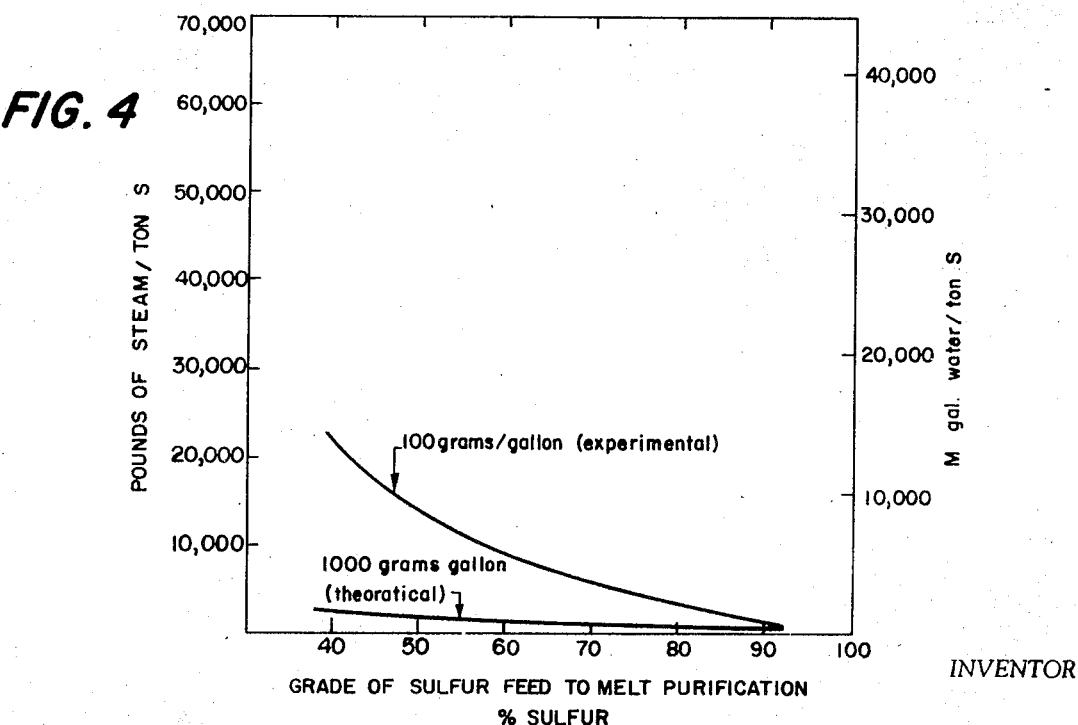
FIG. 4 is a graph having to do with studies on minimum water requirement for water in the gangue stripping action.

Foregoing test results on minimum water requirement have been projected in FIG. 4 which presents grade of impure sulfur in percent sulfur versus gallons of stripping water and pounds of steam for melting each tone of the impure sulfur that is purified. The abscissa and ordinate values are readable through curve A amounting to a theoretical minimum stripping water requirement of 1,000 grams per gallon and through curve B which projects a 100 grams per gallon minimum stripping water requirement already actually found possible to achieve in the present process for certain of the relatively pure starting sulfur-bearing materials noted in the abscissa.

It will be understood by those knowledgeable in the art that improvements in process economy can be had by introducing heat exchange devices in the present purification system. For example, the use of a heat exchanger to transfer heat from the water effluent to the incoming stripping water can substantially reduce the heat requirement. In certain embodiments in accordance with the present invention effluent water is recycled in the process through a cleaning stage such as to lower either the heat requirement or the cost of water or both.

It is well known that aqueous systems containing elemental sulfur tend to form some sulfuric acid. As for materials of construction, iron alloys that resist attack by dilute sulfuric acid are preferred. However, corrosion rates can be controlled by control of the acidity, as for example by some addition of lime. Thus, low-cost steel construction is also suitable.

Stated in more general terms the present invention includes a process for the removal of gangue impurities contained within a molten mixture consisting essentially of molten elemental sulfur and said gangue impurities in minute solid particle form dispersed in the molten sulfur, the process further being characterized by introducing liquid water as a continuous dispersion of droplets at the bottom of the molten impure sulfur in a pressure vessel maintaining sufficient pressure to prevent vaporization of the introduced water and meanwhile providing a region above the molten sulfur to allow the dispersion of the introduced water to coalesce as a layer above the upper surface of the molten sulfur and then withdrawing continuously the coalesced water containing as a suspension a portion of the gangue impurities originally present within the molten sulfur, thereby purifying the molten sulfur.

Figure 3:
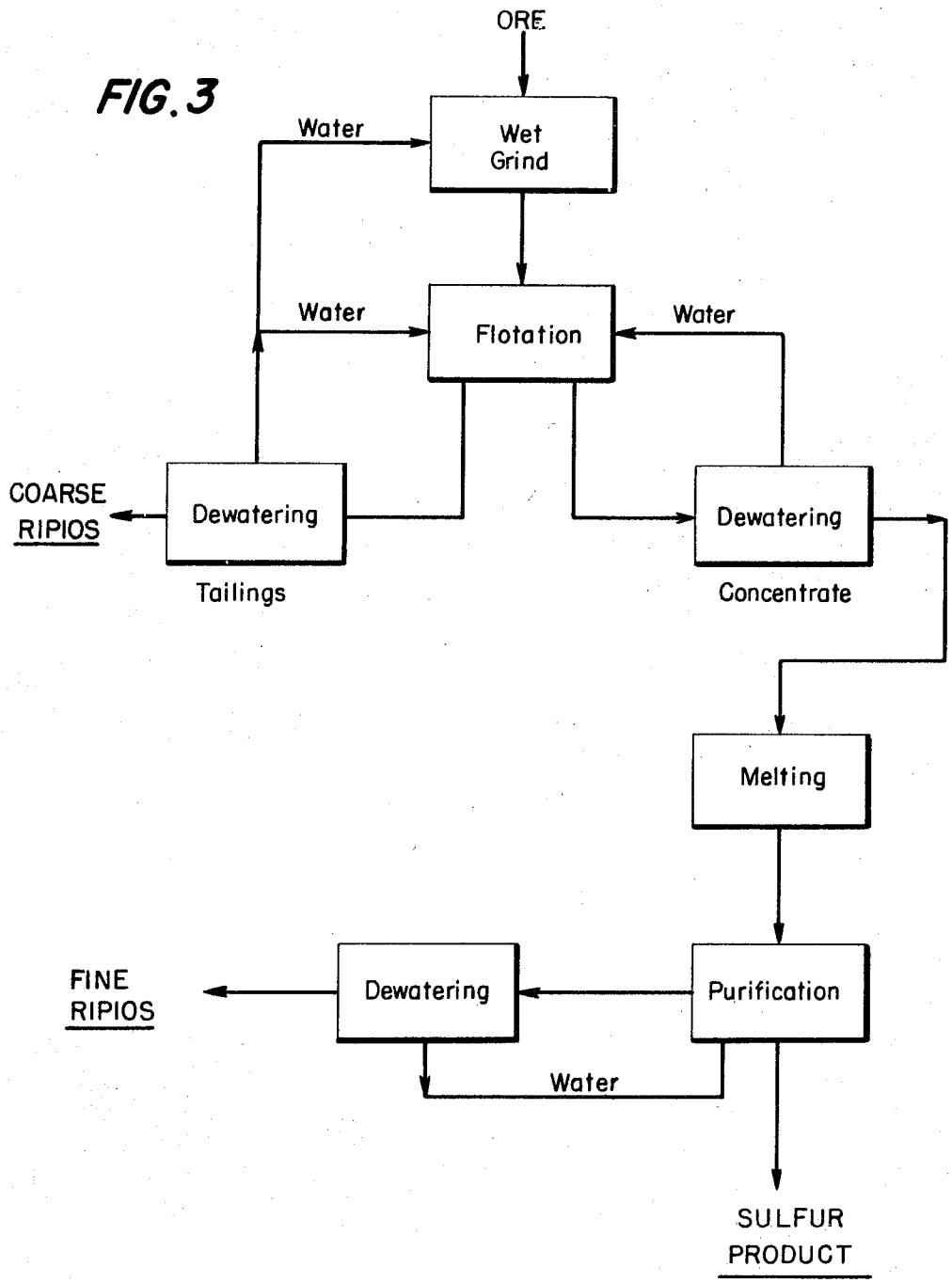
FIG. 3 is a general flow sheet representing integration of practice of the present invention with a preconcentration flotation system.

It becomes clear that this invention may constitute a basis for numerous forms of purification equipment such as single or multistage equipment and continuous countercurrent movement of the water phase and the molten sulfur phase. In addition, this basic invention may be incorporated with preconcentration by numerous conventional beneficiation procedures, as for example by flotation as shown in the flowsheet of FIG. 3 and also may be practiced in systems incorporating various heat exchange devices such as of well-known type to provide optimum heat economy. Such systems are considered wholly within the intent and scope of the invention.

As this invention lends itself to many possible embodiments and as many possible changes may be made in the embodiments hereinbefore set forth, it will be distinctly understood that all matter described herein is to be interpreted as illustrative and not as a limitation.

I claim:

1. A process for purifying sulfur-bearing material contaminated by gangue, which comprises: continuously feeding a fluent mixture consisting essentially of molten sulfur and minute particles of gangue into a substantially vertical column from the top of said column, supplying substantially gangue-free water into said column adjacent to the bottom of said column, said column having a plurality of vertically spaced droplet-forming contact means and weir means to hold up a pool of said fluent mixture on each of said contact means, said contact means introducing droplets of said water into said pools of said fluent mixture and said water droplets bringing off quantities of said minute gangue particles from said molten sulfur, having said spaces between said droplet-forming contact means partition-walled upward from said pooled fluent mixture on a next lower of said droplet-forming contact means to a next upper of said droplet-forming contact means and containing a pool of effluent water walled off laterally from said fluent mixture, and having said water droplets coalescing in said pooled effluent water; maintaining said effluent water flowing through said column, and out of said column adjacent to the top of said column, at a rate within a range of speeds sufficient to carry away quantities of said minute gangue particles brought out from said molten sulfur by said water droplets; removing purified molten sulfur adjacent to the bottom of said column; and contacting additional quantities of said fluent mixture in said column with droplets of water produced on further supply of said substantially gangue-free water into said column adjacent to the bottom of said column.

2. The process of claim 1 wherein substantially gangue-free water flows influently to droplet-forming plates to produce said water droplets.

3. The process of claim 1 wherein said fluent mixture is prepared having said minute gangue particles therein substantially all of −150 mesh size.

4. The process of claim 1 wherein said water droplets and said molten sulfur encountering said water droplets are at temperature and superatmospheric pressure sufficient for maintaining water and sulfur each substantially entirely in liquid phase.

5. The process of claim 1 wherein course of said fluent mixture leads downwardly to said droplet-forming contact means and transversely of said droplet-forming contact means to said weir means in said column, and said water course leads upwardly in said column for said water droplets to ascend through said molten sulfur from said droplet-forming contact means and said molten sulfur flowing subjected to said water droplets to descend through said column.

6. The process of claim 1 wherein sulfur-bearing material from which said fluent mixture is substantially derived is ground to a particle size that will pass through a 150 mesh screen prior to melting in the production of said fluent mixture.

7. The process of claim 6 wherein a portion of said gangue is removed from said sulfur-bearing material after grinding and before melting.

8. The process of claim 7 wherein removal of said portion of gangue is by flotation.

9. A process for purifying sulfur-bearing material contaminated by gangue, which comprises: continuously flowing quantities of a fluent mixture consisting essentially of molten sulfur and minute particles of gangue to droplet-forming contact means in each of differently elevated gangue stripping regions arranged for serial flow, starting with an uppermost first of said gangue stripping regions; supplying substantially gangue-free water upwardly from a lowermost last of said gangue stripping regions on a water course leading in series through said droplet-forming contact means in said gangue stripping regions and having water droplets passing through said molten sulfur in said gangue stripping regions from said droplet-forming contact means and said water droplets bringing off quantities of said minute gangue particles and coalescing sulfur in each of said regions, maintaining said effluent water moving through and from said gangue stripping regions within a range of speeds sufficient to carry away quantities of said minute gangue particles brought from said molten sulfur by said water droplets, and removing effluent water containing removed gangue particles from said uppermost first of said gangue stripping regions; and removing purified molten sulfur from said lowermost last of said gangue stripping regions.

10. The process of claim 9 wherein course of said fluent mixture leads downward being generally horizontal in said regions and said course of said water leads upward, and said courses cross through said stripping regions having said stripping regions at different levels.

11. The process of claim 9 wherein water droplets issue from said water through dropleting orifices into said molten sulfur in said regions.

12. The process of claim 9 wherein said molten sulfur is impounded in said regions and said molten sulfur overflows to a next lower of said regions, and said water droplets in said regions pass upwardly through said impounded molten sulfur.

13. The process of claim 9 wherein course of flow of said fluent mixture leads through pools in said regions, and said water droplets in said regions ascend through molten sulfur in said pools.

14. The process of claim 9 wherein said fluent mixture is prepared having said minute gangue particles therein substantially all of $-150$ mesh size.

* * * * *